(12) United States Patent
Kanoh

(10) Patent No.: US 9,787,879 B2
(45) Date of Patent: Oct. 10, 2017

(54) IMAGE DATA RECEIVING DEVICE

(71) Applicant: Kabushiki Kaisha Toshiba, Minato-ku, Tokyo (JP)

(72) Inventor: Takashi Kanoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 14/980,059

(22) Filed: Dec. 28, 2015

(65) Prior Publication Data

US 2016/0366307 A1    Dec. 15, 2016

(30) Foreign Application Priority Data

Jun. 10, 2015 (JP) ................................. 2015-117744

(51) Int. Cl.
 *H04N 5/93* (2006.01)
 *H04N 5/04* (2006.01)
 (Continued)

(52) U.S. Cl.
 CPC ................. *H04N 5/04* (2013.01); *G09G 5/00* (2013.01); *H04N 5/44* (2013.01)

(58) Field of Classification Search
 None
 See application file for complete search history.

(56) References Cited

U.S. PATENT DOCUMENTS 6,470,051 B1 * 10/2002 Campisano .......... H04N 19/159
                                                                  375/240.21
7,889,974 B2 *  2/2011 Oka ..................... G11B 27/005
                                                                  360/13
(Continued)

FOREIGN PATENT DOCUMENTS

JP        2002-223437 A      8/2002
JP       2011259128 A      12/2011
(Continued)

OTHER PUBLICATIONS

V-by-One® HS Standard, Version 1.4, Dec. 15, 2011, Abridged Edition THine, pp. 1-7 and 36-57.

*Primary Examiner* — Anh-Vu Ly
(74) *Attorney, Agent, or Firm* — White & Case LLP

(57) ABSTRACT

According to one embodiment, there is provided an image data receiving device including $1^{st}$ to $K^{th}$ lane reproduction circuits, $1^{st}$ to $K^{th}$ timing adjustment circuits, $1^{st}$ to $K^{th}$ lane reproduction outputs, and $1^{st}$ to $(K-1)^{th}$ selectors. The $N^{th}$ lane reproduction circuit transmits data of an $n^{th}$ pixel. The $(N+1)^{th}$ lane reproduction circuit transmits data of an $(n+1)^{th}$ pixel adjacent to the $n^{th}$ pixel. The $N^{th}$ timing adjustment circuit has an input terminal electrically connected to the $N^{th}$ lane reproduction circuit. The $(N+1)^{th}$ timing adjustment circuit has an input terminal electrically connected to the $(N+1)^{th}$ lane reproduction circuit. The $N^{th}$ lane reproduction output can be electrically connected to an output terminal of the $N^{th}$ timing adjustment circuit. The $N^{th}$ selector can electrically connect one of the output terminal of the $N^{th}$ timing adjustment circuit and the output terminal of the $(N+1)^{th}$ timing adjustment circuit to the $(N+1)^{th}$ lane reproduction output.

20 Claims, 10 Drawing Sheets

(51) Int. Cl.
    *H04N 5/44*      (2011.01)
    *G09G 5/00*      (2006.01)

(56) References Cited

U.S. PATENT DOCUMENTS

| | | |
|---|---|---|
| 8,942,262 B2 | 1/2015 | Tsubota |
| 2011/0302464 A1 | 12/2011 | Takahashi |
| 2013/0083179 A1 | 4/2013 | Kotani |
| 2015/0042626 A1* | 2/2015 | Van Nostrand ........ G09G 5/006 |
| | | 345/204 |

FOREIGN PATENT DOCUMENTS

| | | | |
|---|---|---|---|
| JP | 5588949 | A | 5/2013 |
| JP | 5672932 | B2 | 1/2015 |

* cited by examiner

|  | TP 1 | TP 2 | TP 3 | TP 4 | TP 5 | ... |
|---|---|---|---|---|---|---|
| LN-0 | Pixel 1 | Pixel 5 | Pixel 9 | Pixel 13 | Pixel 17 | ... |
| LN-1 | Pixel 2 | Pixel 6 | Pixel 10 | Pixel 14 | Pixel 18 | ... |
| LN-2 | Pixel 3 | Pixel 7 | Pixel 11 | Pixel 15 | Pixel 19 | ... |
| LN-3 | Pixel 4 | Pixel 8 | Pixel 12 | Pixel 16 | Pixel 20 | ... |

IMAGE DATA RECEIVING DEVICE

CROSS-REFERENCE TO RELATED APPLICATIONS

This application is based upon and claims the benefit of priority from Japanese Patent Application No. 2015-117744, filed on Jun. 10, 2015; the entire contents of which are incorporated herein by reference.

FIELD

Embodiments described herein relate generally to an image data receiving device.

BACKGROUND

Image data receiving devices receive image data to transfer to an image processing circuit at the subsequent stage. In this case, it is desired to improve the quality of images obtained from the image data.

BRIEF DESCRIPTION OF THE DRAWINGS

FIG. 3 is a diagram showing the configuration of data of a frame image in the first embodiment;

FIG. 4 is a diagram showing a method of transmitting data of the frame image in the first embodiment;

DETAILED DESCRIPTION

In general, according to one embodiment, there is provided an image data receiving device including $1^{st}$ to $K^{th}$ lane reproduction circuits, $1^{st}$ to $K^{th}$ timing adjustment circuits, $1^{st}$ to $K^{th}$ lane reproduction outputs, and $1^{st}$ to $(K-1)^{th}$ selectors. K is an integer of two or greater. If letting N be a positive integer smaller than K and n be a positive integer, the $N^{th}$ lane reproduction circuit transmits data of an $n^{th}$ pixel. The $(N+1)^{th}$ lane reproduction circuit transmits data of an $(n+1)^{th}$ pixel adjacent to the $n^{th}$ pixel. The $N^{th}$ timing adjustment circuit has an input terminal electrically connected to the $N^{th}$ lane reproduction circuit. The $(N+1)^{th}$ timing adjustment circuit has an input terminal electrically connected to the $(N+1)^{th}$ lane reproduction circuit. The $N^{th}$ lane reproduction output can be electrically connected to an output terminal of the $N^{th}$ timing adjustment circuit. The $N^{th}$ selector can electrically connect one of the output terminal of the $N^{th}$ timing adjustment circuit and the output terminal of the $(N+1)^{th}$ timing adjustment circuit to the $(N+1)^{th}$ lane reproduction output.

Exemplary embodiments of an image data receiving device will be explained below in detail with reference to the accompanying drawings. The present invention is not limited to the following embodiments.

First Embodiment

Figure 1:
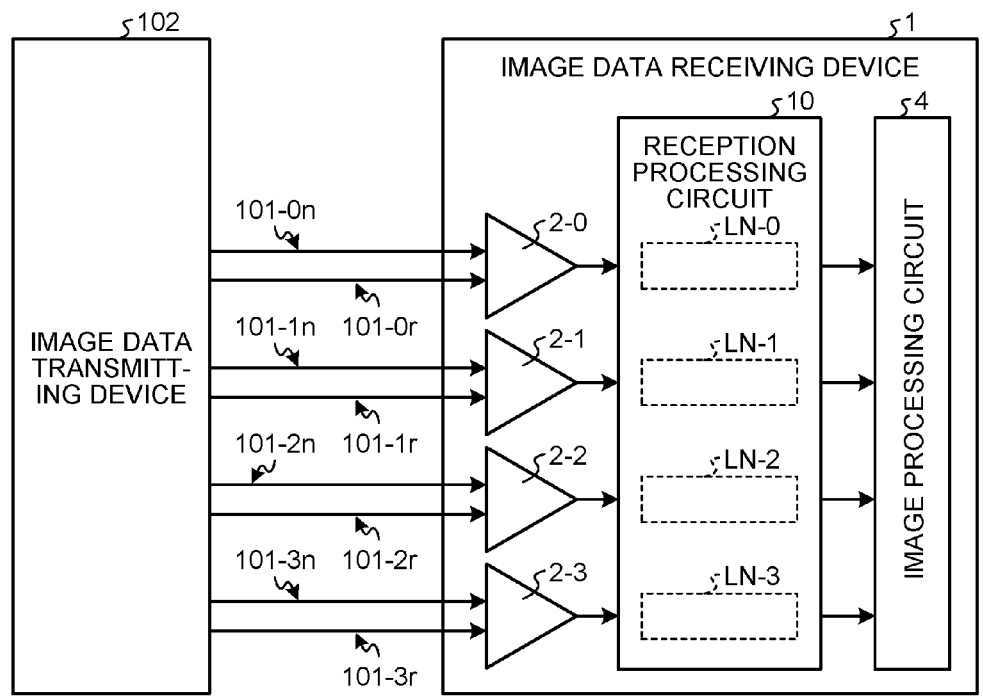
FIG. 1 is a diagram showing the configuration of a communication system to which an image data receiving device according to a first embodiment is applied.
Figure 2:
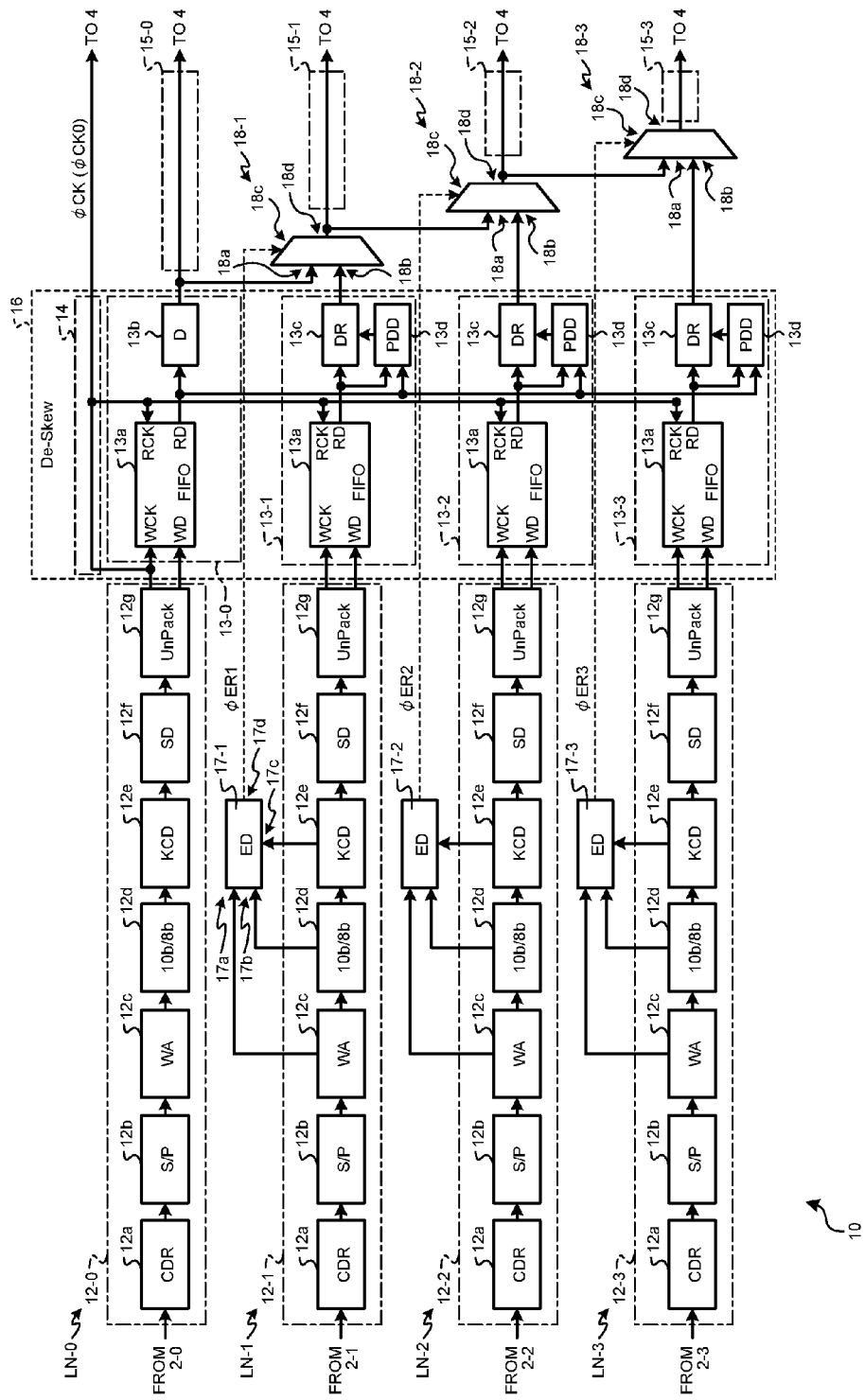
FIG. 2 is a diagram showing the configuration of the image data receiving device according to the first embodiment.

An image data receiving device 1 according to the first embodiment will be described. FIG. 1 is a diagram showing the configuration of a communication system 100 to which the image data receiving device 1 is applied. FIG. 2 is a diagram showing the configuration of a reception processing circuit 10 in the image data receiving device 1.

The image data receiving device 1 is applied to, for example, the communication system 100 shown in FIG. 1. In the communication system 100, the image data receiving device 1 is connected to an image data transmitting device 102 via communication lines (communication cable) 101. The image data receiving device 1 is configured to be able to receive image data from the image data transmitting device 102 via the communication lines 101.

In this case, if the frequency of a clock used in transmission processing in the image data transmitting device 102 is made too high (too high a clock rate), then reception processing in the image data receiving device 1 is likely to be affected by waveform distortion because of physical and electrical properties of the communication lines 101. For example, in the image data receiving device 1, if reception processing is made to have a higher clock rate correspondingly to making transmission processing have a higher clock rate, and if the waveform of the signal received is distorted, then an error occurs in reception processing, or so on, so that the incidence of bit errors may increase to exceed a permissible range. Meanwhile, the transfer rate of image data needs to be made higher than or equal to a required value according to a requirement of devices (such as television sets) in which the image data receiving device 1 is implemented.

In the first embodiment, in order to make the transfer rate of image data higher than or equal to the required value while suppressing making the clock rate of transmission/reception processing higher, the image data transmitting device 102 and the image data receiving device 1 are connected by the multiple communication lines 101. For example, the image data receiving device 1 is configured as a receiving device compliant with a serial interface standard according to which to be able to transmit multiple image data including multiple pixel data in pixel data units. The serial interface standard includes, for example, the V-by-One (registered trademark) standard or the V-by-One HS (registered trademark) standard. The image data receiving device 1 is connected to a transmitting device (not shown) via multiple pairs of communication lines 101 according to the serial interface standard. For example, the image data receiving device 1 is connected to the image data transmitting device 102 via four pairs of communication lines (101-0n, 101-0r), (101-1n, 101-1r), (101-2n, 101-2r), and (101-3n, 101-3r). Each pair of communication lines (101-0n, 101-0r to (101-3n, 101-3r) transmits a differential signal. Multiple receiving interfaces 2-0 to 2-3 receive the multiple differential signals via the pairs of communication lines (101-0n, 101-0r) to (101-3n, 101-3r). Each receiving interface 2-0 to 2-3 generates a single end signal (serial data)

from the differential signal and supplies the generated serial data to a corresponding lane LN-0 to LN-3 in the reception processing circuit 10.

As shown in FIG. 2, the reception processing circuit 10 has the multiple lanes LN-0 to LN-3 corresponding to the pairs of communication lines (101-0n, 101-0r) to (101-3n, 101-3r). Further, a de-skew circuit 16 is provided in the reception processing circuit 10.

The lanes LN-0 to LN-3 have lane reproduction circuits 12-0 to 12-3, timing adjustment circuits 13-0 to 13-3, and lane reproduction outputs 15-0 to 15-3 respectively. The timing adjustment circuits 13-0 to 13-3 are electrically connected between the lane reproduction circuits 12-0 to 12-3 and the lane reproduction outputs 15-0 to 15-3. The de-skew circuit 16 has a reference selection circuit 14 and the timing adjustment circuits 13-0 to 13-3. The timing adjustment circuits 13-0 to 13-3 are respectively shared by the lanes LN-0 to LN-3 and the de-skew circuit 16.

Figure 3:
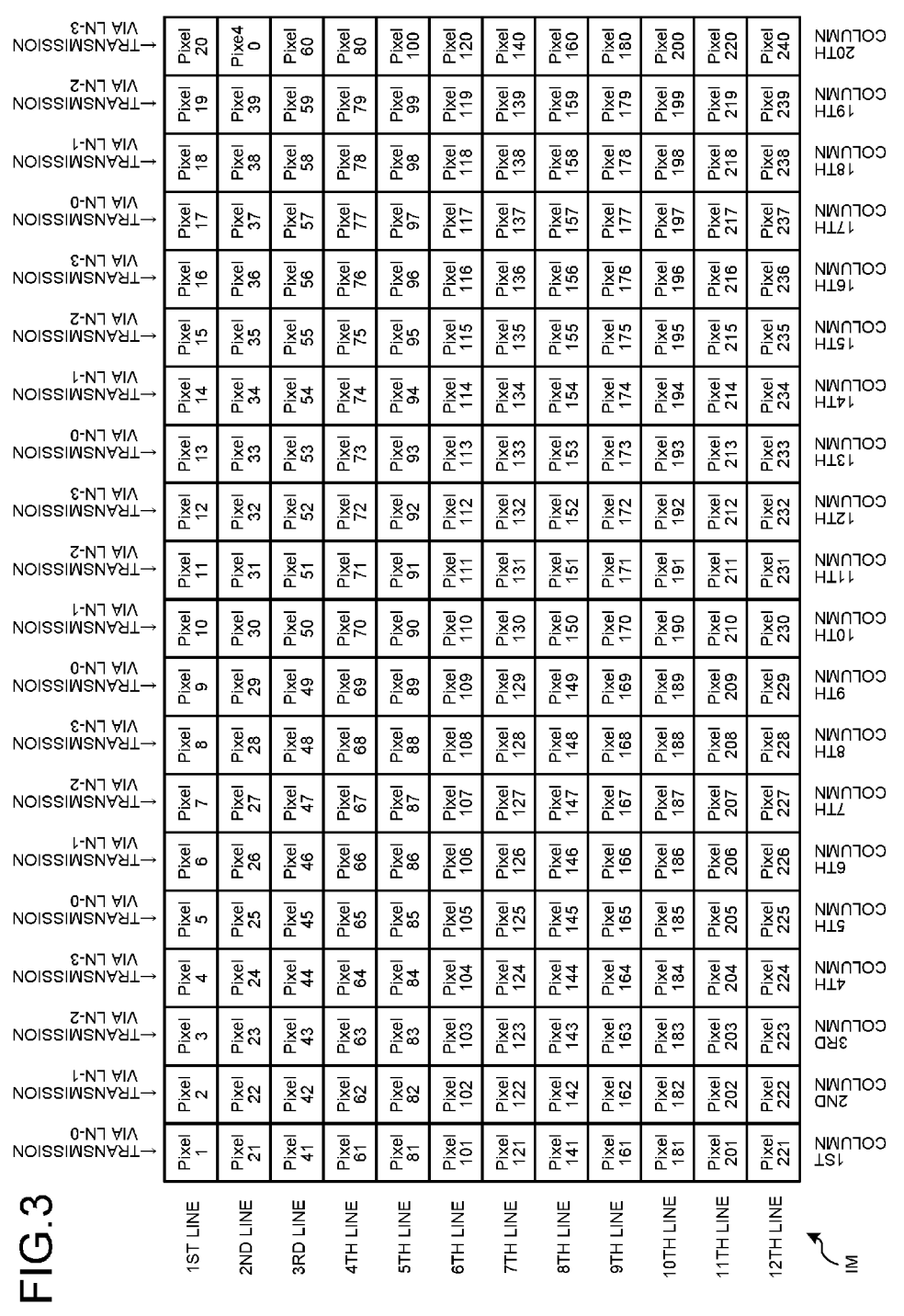

According to the serial interface standard (e.g., the V-by-One HS standard), on the reception side, data of a frame image IM can be divided and transmitted in pixel units using the multiple lanes. For example, as shown in FIGS. 3 and 4, data in pixel units are assigned to the lanes LN-0 to LN-3, and pixel data can be transferred via the lanes LN-0 to LN-3 in parallel (see FIG. 4). FIG. 3 is a diagram showing the configuration of the frame image IM. FIG. 4 is a diagram showing a method of transmitting data of the frame image IM. Pixel data in a pixel unit includes tone information of a first color (e.g., red (R)), tone information of a second color (e.g., green (G)), and tone information of a third color (e.g., blue (B)).

For example, if the frame image IM is formed of 240 pixels in 12 lines×20 columns, pixel data in each four columns, starting from the leftmost, of the first line are assigned to the lanes LN-0 to LN-3 sequentially, and pixel data are transferred via the lanes LN-0 to LN-3 (see FIG. 2) in parallel. As shown in FIG. 4, in period TP1, pixel data Pixel1 is transmitted via the lane LN-0; pixel data Pixel2 is transmitted via the lane LN-1; pixel data Pixel3 is transmitted via the lane LN-2; and pixel data Pixel4 is transmitted via the lane LN-3. In period TP2, pixel data Pixel5 is transmitted via the lane LN-0; pixel data Pixel6 is transmitted via the lane LN-1; pixel data Pixel7 is transmitted via the lane LN-2; and pixel data Pixel8 is transmitted via the lane LN-3. In period TP3, pixel data Pixel9 is transmitted via the lane LN-0; pixel data Pixel10 is transmitted via the lane LN-1; pixel data Pixel11 is transmitted via the lane LN-2; and pixel data Pixel12 is transmitted via the lane LN-3. In period TP4, pixel data Pixel13 is transmitted via the lane LN-0; pixel data Pixel14 is transmitted via the lane LN-1; pixel data Pixel15 is transmitted via the lane LN-2; and pixel data Pixel16 is transmitted via the lane LN-3. In period TP5, pixel data Pixel17 is transmitted via the lane LN-0; pixel data Pixel18 is transmitted via the lane LN-1; pixel data Pixel19 is transmitted via the lane LN-2; and pixel data Pixel20 is transmitted via the lane LN-3.

When transmission of the first line has finished, transmission of the second line is performed. Likewise for the subsequent lines, and when transmission of the twelfth line has finished, transmission of all pixel data of the frame image IM finishes.

Next, the configurations of each lane LN and the de-skew circuit 16 will be described in further detail using FIG. 2.

In the lane LN-0, the lane reproduction circuit 12-0 is electrically connected between the receiving interface 2-0 and an input terminal of the timing adjustment circuit 13-0. The lane reproduction circuit 12-0 has a clock data recovery circuit (CDR circuit) 12a, a serial/parallel converting circuit (S/P circuit) 12b, a word alignment circuit (WA circuit) 12c, an 8 B10 B decoding circuit (10b/8b circuit) 12d, a K code detection circuit (KCD circuit) 12e, a scramble decoding circuit (SD circuit) 12f, and a data unpack circuit (UnPack circuit) 12g.

The CDR circuit 12a receives serial data (pixel data) from the receiving interface 2-0. The serial data has been 8 B/10 B converted by the image data transmitting device 102 according to a predetermined conversion table at the time of transmission, and a clock is laid over the data. That is, a clock is embedded in the serial data by converting the serial data such that the durations of its low (L) level and high (H) level are less than or equal to four clock cycles of a clock for transmission processing. The CDR circuit 12a recovers the clock embedded in the serial data using edges of pulses in the serial data.

For example, the CDR circuit 12a has a PLL and recovers the clock from the serial data using the PLL. The CDR circuit 12a detects the phases of the serial data based on edges of pulses in the serial data. The CDR circuit 12a compares the phases of the serial data and the phase of an internal clock by a phase comparator to generate a control signal according to the comparing result of the phase comparator. The CDR circuit 12a has a VCO oscillate according to the generated control signal to generate a clock and outputs the generated clock while feeding back an internal clock obtained by dividing its frequency to the phase comparator.

For example, the CDR circuit 12a generates (recovers) a clock for serial transfer, a clock for parallel transfer, and a clock for unpackage. The clock for parallel transfer is a clock obtained by dividing the frequency of the clock for serial transfer by ten correspondingly to the bit width (e.g., a 10-bit width) of parallel data. The bit width of parallel data is set at the number of bits corresponding to one word. The clock for unpackage is a clock obtained by dividing the frequency of the clock for parallel transfer by three correspondingly to the number of bytes (e.g., three) of one-pixel data.

The CDR circuit 12a latches the serial data on the clock for serial transfer and then transfers the serial data to the S/P circuit 12b. Further, the CDR circuit 12a supplies the clock for serial transfer and the clock for parallel transfer to the S/P circuit 12b, supplies the clock for parallel transfer to the WA circuit 12c, 8 B/10 B circuit 12d, KCD circuit 12e, and SD circuit 12f, and supplies the clock for parallel transfer and the clock for unpackage to the UnPack circuit 12g.

The S/P circuit 12b receives the clock for serial transfer, the clock for parallel transfer, and the serial data from the CDR circuit 12a. The S/P circuit 12b converts the serial data (a one-bit width) into a 10-bit width of parallel data using the clock for serial transfer and the clock for parallel transfer. The ten bits correspond in bit number to one word. For example, the S/P circuit 12b has a shift register and a latch circuit for parallel transfer, takes the serial data into the shift register synchronously with the clock for serial transfer, and latches the outputs of the stages of the shift register into the latch circuit for parallel transfer synchronously with the clock for parallel transfer, thereby converting it into parallel data.

The WA circuit 12c receives the parallel data from the S/P circuit 12b. Because word boundaries are missing in the parallel data, the WA circuit 12c aligns the data into words using the clock for parallel transfer and predefined bit patterns for alignment to recover bit positions of word boundaries. The WA circuit 12c recovers the bit position of a word boundary within the bit width (e.g., a 10-bit width) of the parallel data. For example, the WA circuit 12c can shift the bits of the data so that the LSB or MSB in the bit width of the parallel data is at a word boundary.

The 10 b/8 b circuit 12d receives the recovered data in a word unit, that is, 10-bit data from the WA circuit 12c. The 10 b/8 b circuit 12d decodes the 10-bit data into 8-bit data+a 1-bit control code identifier using the clock for parallel transfer and the same predetermined conversion table as was used in 8 B/10 B conversion at the time of transmission.

The KCD circuit 12e receives 'the 8-bit data'+'the 1-bit control code identifier' from the 10 b/8 b circuit 12d. The KCD circuit 12e detects whether the type of 'the decoded 8-bit data' is user data or control data using the clock for parallel transfer and 'the 1-bit control code identifier'. If 'the 1-bit control code identifier' is a D code, the KCD circuit 12e detects that 'the 8-bit data' is pixel data (e.g., tone information of one of the first to third colors). If 'the 1-bit control code identifier' is a K code, the KCD circuit 12e detects that 'the 8-bit data' is control data.

If detecting the K code, the KCD circuit 12e can further detect the type of the K code. The KCD circuit 12e can detect that 'the 8-bit data' is a video synchronization signal according to the type of the detected K code. Or the KCD circuit 12e can detect that 'the 8-bit data' is a scramble reset signal according to the type (e.g., a K28.0 code) of the detected K code.

The SD circuit 12f receives 'the 8-bit data' and the result of detecting the K code (the result of detecting the presence/absence and type of the K code) from the KCD circuit 12e. For example, if it is detected that 'the 8-bit data' is the scramble reset signal, the SD circuit 12f descrambles input pixel data using the scramble reset signal as a reference. That is, the pixel data has been scrambled by the image data transmitting device 102 according to a predetermined random number table at the time of transmission in order to avoid the same symbol being transmitted over the communication lines (communication cable) 101 continuously for a long time. The SD circuit 12f can descramble the pixel data with the scramble reset signal as a reference using the same random number table as was used to scramble at the time of transmission.

The UnPack circuit 12g receives the pixel data from the SD circuit 12f. For example, the UnPack circuit 12g receives tone information of the first color, tone information of the second color, and tone information of the third color sequentially. Each of the tone information of the first color, tone information of the second color, and tone information of the third color is one-byte (one-word) pixel data. Combined information of the tone information of the first color, tone information of the second color, and tone information of the third color can constitute pixel data in a pixel unit. Hence, the UnPack circuit 12g generates a three-byte width of parallel data of the tone information of the first color, tone information of the second color, and tone information of the third color in combination according to packet data mapping defined in the serial interface standard (e.g., the V-by-One HS standard) with use of the clock for parallel transfer. That is, the UnPack circuit 12g generates (unpacks) a three-byte width of parallel data of the tone information of the first color, tone information of the second color, and tone information of the third color in combination as pixel data in a pixel unit. The UnPack circuit 12g outputs the pixel data in a pixel unit to the timing adjustment circuit 13-0 using the clock for unpackage while outputting the clock for unpackage $\phi CK0$ to the timing adjustment circuit 13-0.

Likewise, the other lane reproduction circuits 12-1 to 12-3 have the CDR circuit 12a, S/P circuit 12b, WA circuit 12c, 10 b/8 b circuit 12d, KCD circuit 12e, SD circuit 12f, and UnPack circuit 12g.

The de-skew circuit 16 compensates for clock skews (deviations of clock timing) between the lanes LN.

The reference selection circuit 14 receives a clock (clock for unpackage) from a lane reproduction circuit of a reference lane from among the lane reproduction circuits 12-0 to 12-3. In the case of FIG. 2, the lane LN-0 is determined to be the reference lane, and the reference selection circuit 14 receives the clock $\phi CK0$ from the UnPack circuit 12g of the lane reproduction circuit 12-0 of the lane LN-0 to distribute as a pixel clock $\phi CK$ of reading operation to the timing adjustment circuits 13-0 to 13-3.

The timing adjustment circuit 13-0 has an input terminal electrically connected to the lane reproduction circuit 12-0, an input terminal electrically connected to the reference selection circuit 14, and an output terminal electrically connected to the lane reproduction output 15-0. The timing adjustment circuit 13-0 has a FIFO memory 13a and a fixed delay circuit 13b. The pixel data received from the UnPack circuit 12g via a data input WD is written into the FIFO memory 13a synchronously with the pixel clock $\phi CK0$ for write operation received via a clock input WCK. The FIFO memory 13a outputs pixel data to the fixed delay circuit 13b via a data output RD synchronously with the pixel clock $\phi CK$ of reading operation received via a clock input RCK. The fixed delay circuit 13b gives a predetermined fixed delay D to the pixel data to output to the lane reproduction output 15-0. The lane reproduction output 15-0 transfers the pixel data to an image processing circuit 4 (see FIG. 1).

The timing adjustment circuit 13-1 has an input terminal electrically connected to the lane reproduction circuit 12-1, an input terminal electrically connected to the reference selection circuit 14, and an output terminal that can be electrically connected to the lane reproduction output 15-1. The timing adjustment circuit 13-1 has a FIFO memory 13a, a phase difference detection circuit 13d, and a delay adjustment circuit 13c. The pixel data received from the UnPack circuit 12g via a data input WD is written into the FIFO memory 13a synchronously with the for-write pixel clock $\phi CK1$ received via a clock input WCK. The FIFO memory 13a outputs pixel data to the delay adjustment circuit 13c via a data output RD synchronously with the pixel clock $\phi CK$ of reading operation received via a clock input RCK. The phase difference detection circuit 13d extracts timing reference signals such as a blanking start code and a blanking end code in the serial interface standard from each of the output data of the FIFO memory 13a of the reference lane LN-0 and the output data of the FIFO memory 13a of the reference lane LN-1 and supplies the phase difference between the two to the delay adjustment circuit 13c. The delay adjustment circuit 13c adjusts a delay amount DR of the delay adjustment circuit 13c according to the phase difference between the two and gives the adjusted delay amount DR to the pixel data. Thus, the timing adjustment circuit 13-1 can make the phase of the pixel data of the lane LN-1 coincide with the phase of the pixel data of the lane LN-0. The delay adjustment circuit 13c can output the pixel data to the lane reproduction output 15-1.

The other timing adjustment circuits 13-2, 13-3 are similar to the timing adjustment circuit 13-1.

The de-skew circuit 16 supplies the pixel clock $\phi CK$ to the timing adjustment circuits 13-0 to 13-3 in common and hence can compensate for clock skews. That is, the pixel clock $\phi CK0$ of the lane LN-0 is used as the clock $\phi CK$ used to read data from the FIFO memories 13*a* of the lanes LN-0 to LN-3. Note that all processing in the stages subsequent to the FIFO memory 13*a* of each lane LN can be performed synchronously with the pixel clock φCK0.

Figure 5:
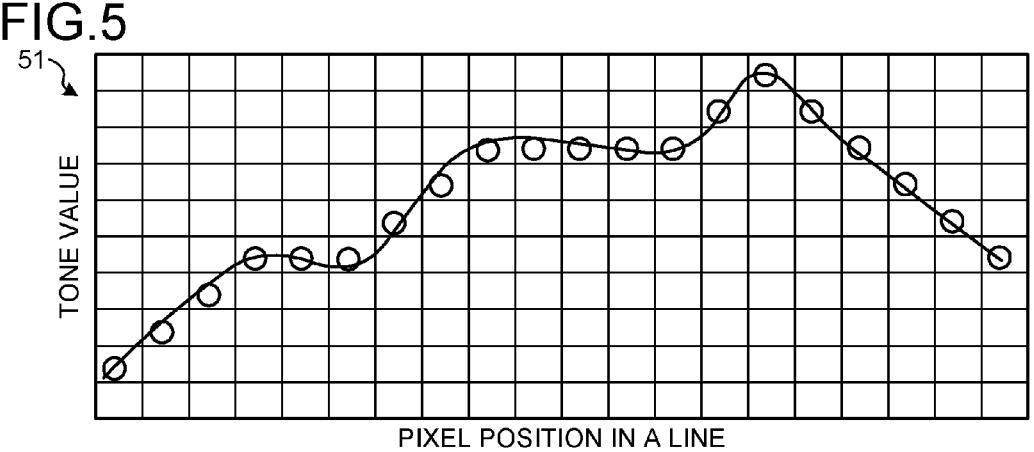
FIG. 5 is graphs showing the distribution of tone values of pixel data in the first embodiment.
Figure 5:
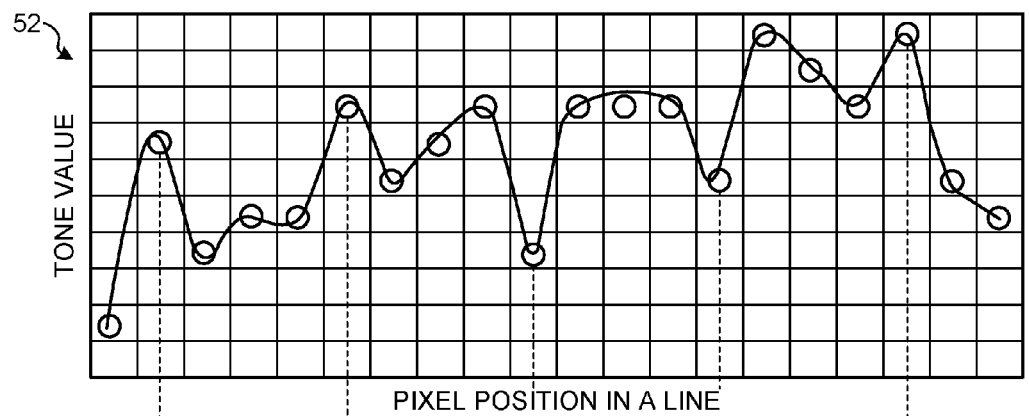
Figure 5:
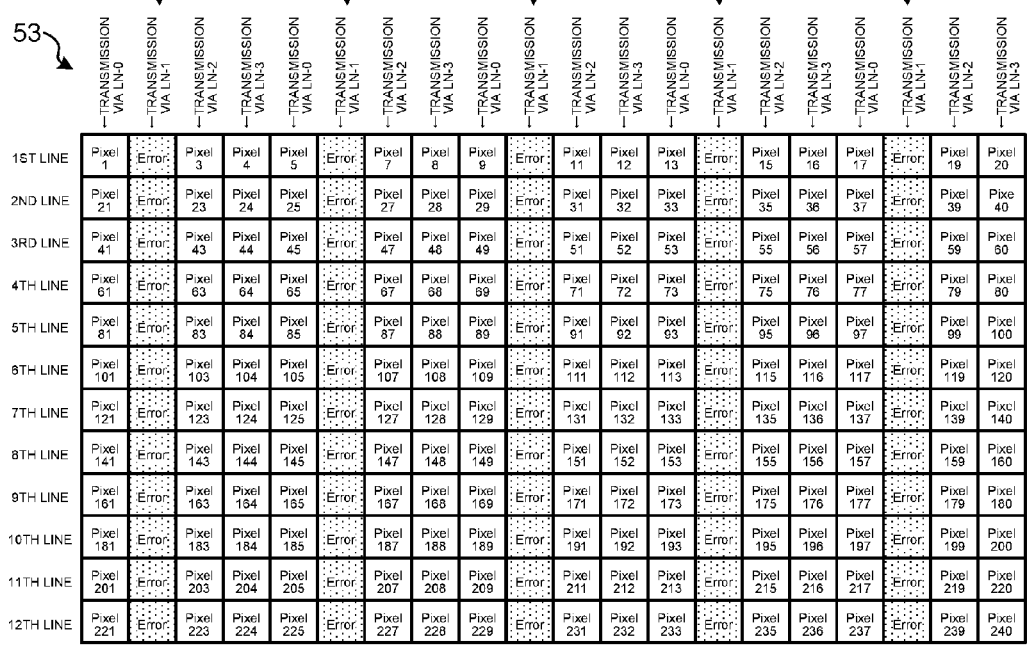

In the reception processing circuit 10 shown in FIG. 2, a transmission error may occur in the lane reproduction circuit 12-0 to 12-3. For example, if a transmission error occurs in the lane reproduction circuit 12-1 of the lane LN-1 while data of the frame image IM (see FIG. 3) is being transmitted, so that reception processing of pixel data cannot be performed normally, then the waveform of a transmitted video signal shown in 51 of FIG. 5 is distorted as the waveform shown in 52 of FIG. 5. The 51 of FIG. 5 is a graph showing the distribution of tone values of a predetermined color component in pixel data at the time of transmission and corresponds to tone information of any of the first, second, and third colors. The 52 of FIG. 5 is a graph showing the distribution of tone values of a predetermined color component in pixel data recovered in the reception processing circuit 10 and corresponds to tone information of any of the first, second, and third colors.

For example, for each lane LN, data is scrambled according to the serial interface standard, and the transmission interval of a scramble reset control signal is 512 lines at longest. Hence, if a scramble reset timing deviates due to a transmission error in the lane reproduction circuit 12 of a lane LN, then not correctly descrambled data may continue to be output for the period of 512 lines at longest.

As shown in 52 of FIG. 5, if a transmission error occurs in the lane reproduction circuit 12-1 of the lane LN-1, then error pixels occur periodically so as to be in longitudinal lines in the frame image IM as shown in 53 of FIG. 5 because the data cannot be descrambled or so on. Hence, visually very conspicuous screen noise is likely to occur in an image obtained by the image processing circuit (see FIG. 1) from one frame worth of pixel data (data of the frame image IM), so that the image quality is likely to degrade.

Accordingly, in the first embodiment, the reception processing circuit 10 detects the occurrence of a transmission error and replaces pixel data of the lane where the transmission error has occurred with pixel data of an adjacent lane, thereby suppressing degradation in image quality due to the transmission error.

Specifically, the reception processing circuit 10 further has multiple error detection circuits 17-1 to 17-3 and multiple selectors 18-1 to 18-3. The error detection circuit 17-1 and the selector 18-1 are included in the lane LN-1. The error detection circuit 17-2 and the selector 18-2 are included in the lane LN-2. The error detection circuit 17-3 and the selector 18-3 are included in the lane LN-3.

The error detection circuit 17-1 has input terminals 17*a*, 17*b*, 17*c* and an output terminal 17*d*. The input terminal 17*a* is electrically connected to the WA circuit 12*c* of the lane reproduction circuit 12-1. The input terminal 17*b* is electrically connected to the 10 b/8 b circuit 12*d* of the lane reproduction circuit 12-1. The input terminal 17*c* is electrically connected to the KCD circuit 12*e* of the lane reproduction circuit 12-1. The output terminal 17*d* is electrically connected to a control terminal 18*c* of the selector 18-1. The other error detection circuits 17-2, 17-3 are similar to the error detection circuit 17-1. Thus, the presence/absence of an error occurring can be detected in each lane LN-1 to LN-3 other than the reference lane LN-0.

For example, each error detection circuit 17-1 to 17-3 initially de-asserts error detection flags φER1, φER2, φER3. Then each error detection circuit 17-1 to 17-3 detects one of the following conditions (1) to (4) to determine that an error has occurred and to assert the error detection flag φER1, φER2, φER3.

(1) A need to realign words occurs in the WA circuit 12*c*.
(2) A bit pattern not defined in the conversion table used at the time of transmission (ANSI 8 B10 B encoding rule violation) has been detected in the 10 b/8 b circuit 12*d*.
(3) A polarity violation of the symbol corresponding to a decoded bit pattern (a disparity error) has been detected in the 10 b/8 b circuit 12*d*.
(4) A scramble reset signal has not been detected for a predetermined period in the KCD circuit 12*e*.

Further, each error detection circuit 17-1 to 17-3 de-asserts the error detection flag φER1, φER2, φER3 in response to the KCD circuit 12*e* detecting a scramble reset signal.

The selector 18-1 has input terminals 18*a*, 18*b*, a control terminal 18*c*, and an output terminal 18*d*. The input terminal 18*a* is electrically connected to the output terminal of the timing adjustment circuit 13-0. The input terminal 18*b* is electrically connected to the output terminal of the timing adjustment circuit 13-1. The control terminal 18*c* is electrically connected to the output terminal 17*d* of the error detection circuit 17-1. The output terminal 18*d* is electrically connected to the lane reproduction output 15-1 and the input terminal 18*a* of the selector 18-2.

The selector 18-1 electrically connects one of the output terminal of the timing adjustment circuit 13-0 and the output terminal of the timing adjustment circuit 13-1 to the lane reproduction output 15-1 according to the error detection flag φER1 received via the control terminal 18*c*.

The selector 18-1 electrically connects the output terminal of the timing adjustment circuit 13-1 to the lane reproduction output 15-1 if the error detection flag φER1 is de-asserted. That is, if the error detection circuit 17-1 has not detected a data error in the lane reproduction circuit 12-1, the selector 18-1 electrically connects the output terminal of the timing adjustment circuit 13-1 to the lane reproduction output 15-1. Thus, if pixel data of the lane LN-1 having been transferred via the lane reproduction circuit 12-1 and via the timing adjustment circuit 13-1 does not include an error, the pixel data can be transferred to the lane reproduction output 15-1. The lane reproduction output 15-1 transfers the pixel data to the image processing circuit 4 (see FIG. 1).

The selector 18-1 electrically connects the output terminal of the timing adjustment circuit 13-0 to the lane reproduction output 15-1 if the error detection flag φER1 is asserted. That is, if the error detection circuit 17-1 has detected a data error in the lane reproduction circuit 12-1, the selector 18-1 electrically connects the output terminal of the timing adjustment circuit 13-0 to the lane reproduction output 15-1. Thus, transferring pixel data including an error to the lane reproduction output 15-1 can be prevented, and pixel data of the lane LN-1 can be replaced with pixel data of the adjacent lane LN-0, which is transferred to the lane reproduction output 15-1. The lane reproduction output 15-1 transfers the pixel data after the replacement to the image processing circuit 4 (see FIG. 1).

The selector 18-2 has input terminals 18*a*, 18*b*, a control terminal 18*c*, and an output terminal 18*d*. The input terminal 18*a* is electrically connected to the output terminal 18*d* of the selector 18-1. The input terminal 18*b* is electrically connected to the output terminal of the timing adjustment circuit 13-2. The control terminal 18*c* is electrically connected to the output terminal 17*d* of the error detection circuit 17-2. The output terminal 18*d* is electrically connected to the lane reproduction output 15-2 and the input terminal 18b of the selector 18-3.

The selector 18-2 electrically connects one of the output terminal 18d of the selector 18-1 and the output terminal of the timing adjustment circuit 13-2 to the lane reproduction output 15-2 according to the error detection flag φER2 received via the control terminal 18c.

The selector 18-2 electrically connects the output terminal of the timing adjustment circuit 13-2 to the lane reproduction output 15-2 if the error detection flag φER2 is de-asserted. That is, if the error detection circuit 17-2 has not detected a data error in the lane reproduction circuit 12-2, the selector 18-2 electrically connects the output terminal of the timing adjustment circuit 13-2 to the lane reproduction output 15-2. Thus, if pixel data of the lane LN-2 having been transferred via the lane reproduction circuit 12-2 and via the timing adjustment circuit 13-2 does not include an error, the pixel data can be transferred to the lane reproduction output 15-2. The lane reproduction output 15-2 transfers the pixel data to the image processing circuit 4 (see FIG. 1).

The selector 18-2 electrically connects the output terminal 18d of the selector 18-1 to the lane reproduction output 15-2 if the error detection flag φER2 is asserted. That is, if the error detection circuit 17-2 has detected a data error in the lane reproduction circuit 12-2, the selector 18-2 electrically connects the output terminal 18d of the selector 18-1 to the lane reproduction output 15-2. Thus, transferring pixel data including an error to the lane reproduction output 15-2 can be prevented, and pixel data of the lane LN-2 can be replaced with pixel data of the adjacent lane LN-1, which is transferred to the lane reproduction output 15-2. The lane reproduction output 15-2 transfers the pixel data after the replacement to the image processing circuit 4 (see FIG. 1).

The selector 18-3 has input terminals 18a, 18b, a control terminal 18c, and an output terminal 18d. The input terminal 18a is electrically connected to the output terminal 18d of the selector 18-2. The input terminal 18b is electrically connected to the output terminal of the timing adjustment circuit 13-3. The control terminal 18c is electrically connected to the output terminal 17d of the error detection circuit 17-3. The output terminal 18d is electrically connected to the lane reproduction output 15-3.

The selector 18-3 electrically connects one of the output terminal 18d of the selector 18-2 and the output terminal of the timing adjustment circuit 13-3 to the lane reproduction output 15-3 according to the error detection flag φER3 received via the control terminal 18c.

The selector 18-3 electrically connects the output terminal of the timing adjustment circuit 13-3 to the lane reproduction output 15-3 if the error detection flag φER3 is de-asserted. That is, if the error detection circuit 17-3 has not detected a data error in the lane reproduction circuit 12-3, the selector 18-3 electrically connects the output terminal of the timing adjustment circuit 13-3 to the lane reproduction output 15-3. Thus, if pixel data of the lane LN-3 having been transferred via the lane reproduction circuit 12-3 and via the timing adjustment circuit 13-3 does not include an error, the pixel data can be transferred to the lane reproduction output 15-3. The lane reproduction output 15-3 transfers the pixel data to the image processing circuit 4 (see FIG. 1).

The selector 18-3 electrically connects the output terminal 18d of the selector 18-2 to the lane reproduction output 15-3 if the error detection flag φER3 is asserted. That is, if the error detection circuit 17-3 has detected a data error in the lane reproduction circuit 12-3, the selector 18-3 electrically connects the output terminal 18d of the selector 18-2 to the lane reproduction output 15-3. Thus, transferring pixel data including an error to the lane reproduction output 15-3 can be prevented, and pixel data of the lane LN-3 can be replaced with pixel data of the adjacent lane LN-2, which is transferred to the lane reproduction output 15-3. The lane reproduction output 15-3 transfers the pixel data after the replacement to the image processing circuit 4 (see FIG. 1).

Figure 6:
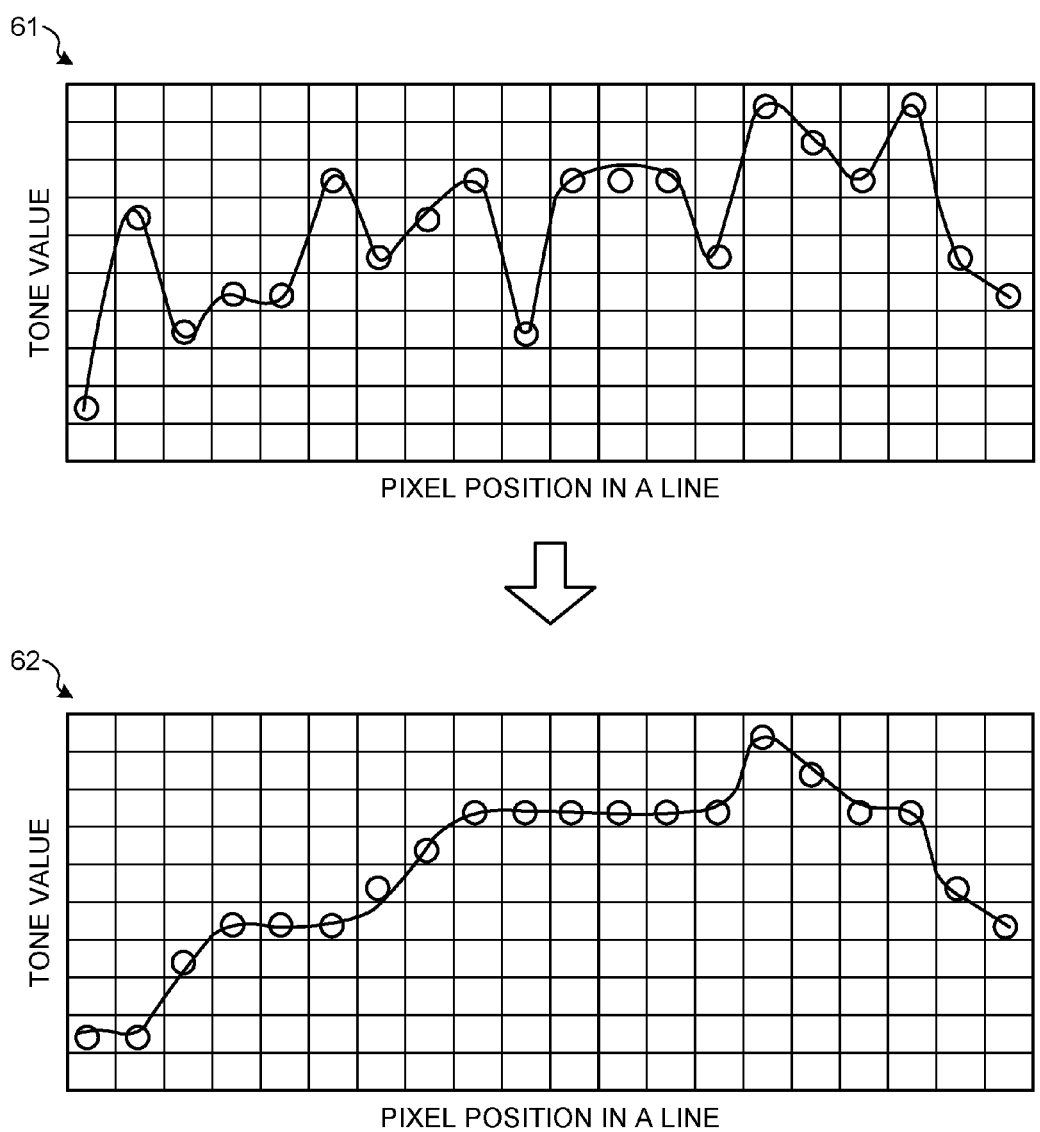
FIG. 6 is graphs showing replacement processing of pixel data in the first embodiment.

Next, the replacement processing will be described using FIG. 6. The 61 of FIG. 6 is a graph showing the distribution of tone values of a predetermined color component in pixel data before the replacement that has been recovered in the reception processing circuit 10 and corresponds to tone information of any of the first, second, and third colors. The 62 of FIG. 6 is a graph showing the distribution of tone values of a predetermined color component in pixel data after the replacement that has been recovered in the reception processing circuit 10 and corresponds to tone information of any of the first, second, and third colors.

For example, as shown in 61 of FIG. 6, if a transmission error occurs in the lane reproduction circuit 12-1 of the lane LN-1, then tone values of the predetermined color component in pixel data of the lane LN-1 become inappropriate values that are greatly different from tone values of an adjacent lane LN. At this time, because pixel data of the lane LN-1 can be replaced with pixel data of the adjacent lane LN-0, tone values of pixel data of the lane LN-1 can be made close to more appropriate values as shown in 62 of FIG. 6. Thus, as shown in 62 of FIG. 6, the distribution of tone values of pixel data recovered in the reception processing circuit 10 can be made close to the distribution of tone values of pixel data at the time of transmission (see 51 of FIG. 5). Therefore, screen noise can be made visually not conspicuous in an image obtained by the image processing circuit 4 (see FIG. 1) from one frame worth of pixel data (data of the frame image IM), so that the image quality can be improved.

Or, for example, although not shown, if a transmission error occurs in each of the lane reproduction circuits 12-1, 12-2 of the lanes LN-1, LN-2, then tone values of the predetermined color component in pixel data of the lanes LN-1, LN-2 become inappropriate values that are greatly different from tone values of an adjacent lane LN. At this time, because pixel data of the lanes LN-1, LN-2 can be replaced with pixel data of the adjacent lane LN-0, tone values of pixel data of the lanes LN-1, LN-2 can be made close to more appropriate values. Thus, the distribution of tone values of pixel data recovered in the reception processing circuit 10 can be made close to the distribution of tone values of pixel data at the time of transmission (see 51 of FIG. 5). Therefore, screen noise can be made visually not conspicuous in an image obtained by the image processing circuit 4 (see FIG. 1) from one frame worth of pixel data (data of the frame image IM), so that the image quality can be improved.

As described above, in the first embodiment, in the reception processing circuit 10, the error detection circuit 17 of each lane LN other than the reference lane detects the occurrence of a transmission error, and pixel data of the lane LN where the transmission error has occurred is replaced with pixel data of an adjacent lane LN. Thus, degradation in image quality due to the transmission error in an image obtained from one frame worth of pixel data (image data) transmitted by the reception processing circuit 10 can be suppressed.

It should be noted that, although FIG. 2 illustrates the case where the number of lanes in the reception processing circuit 10 is four, the number of lanes in the reception processing circuit 10 may be another number as long as the number is two or greater. For example, the number of lanes may be two, eight, or sixteen.

Second Embodiment

Figure 7:
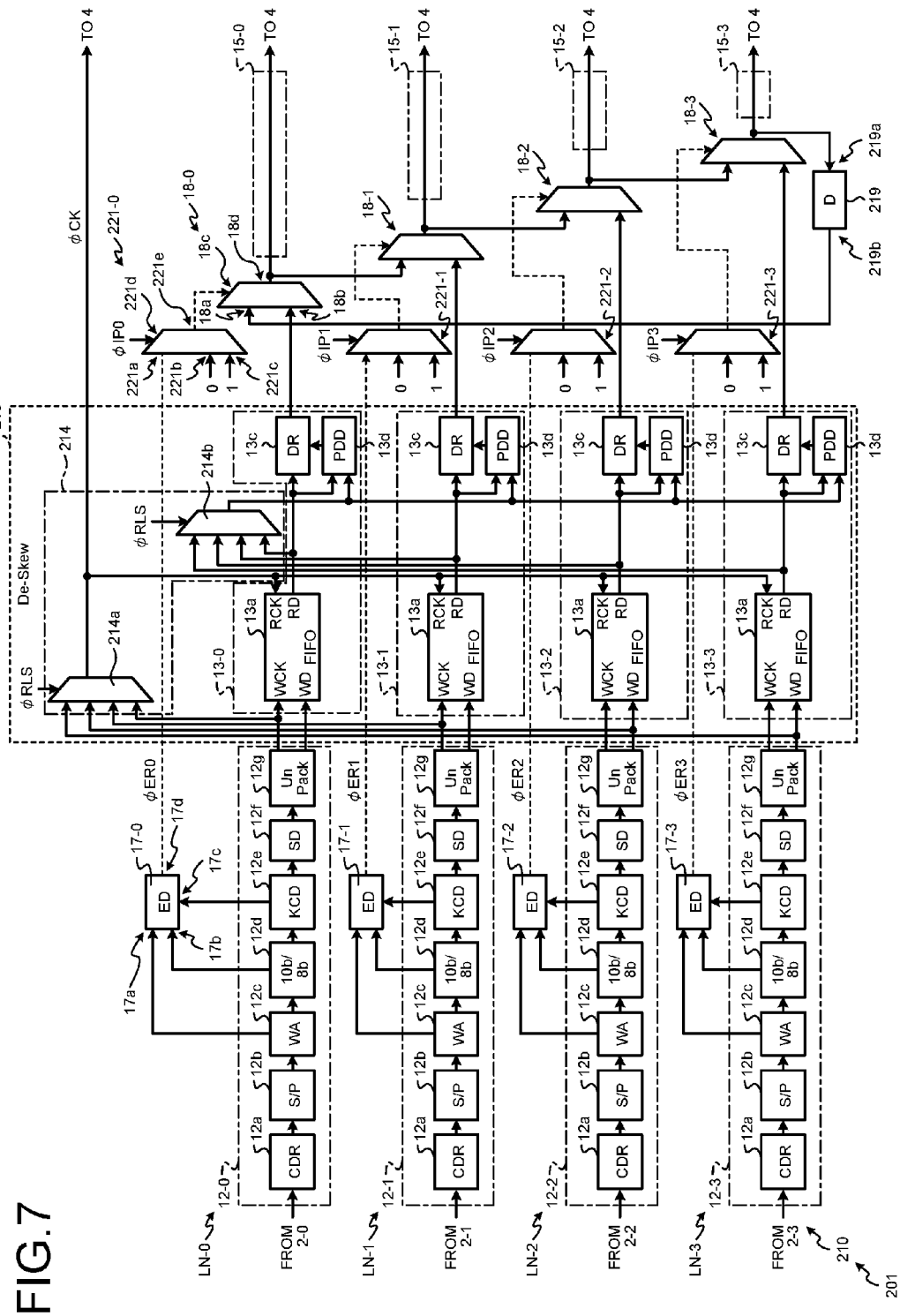
FIG. 7 is a diagram showing the configuration of an image data receiving device according to a second embodiment.

Next, an image data receiving device 201 according to the second embodiment will be described. FIG. 7 is a diagram showing the configuration of a reception processing circuit 210 in the image data receiving device 201. Description will be made below focusing on the differences from the first embodiment.

In the first embodiment, with one lane LN-0 of the lanes LN-0 to LN-3 as a reference lane, the replacement processing is performed in response to the occurrence of an error in any of the lanes LN-1 to LN-3 other than the reference lane LN-0. In the second embodiment, the reception processing circuit is configured such that the replacement processing can be performed in response to the occurrence of an error in the reference lane LN-0 as well.

Specifically, the reception processing circuit 210 in the image data receiving device 201 further has an error detection circuit 17-0, a selector 18-0, and a fixed delay circuit 219.

The error detection circuit 17-0 has input terminals 17a, 17b, 17c and an output terminal 17d. The input terminal 17a is electrically connected to the WA circuit 12c of the lane reproduction circuit 12-0. The input terminal 17b is electrically connected to the 10 b/8 b circuit 12d of the lane reproduction circuit 12-0. The input terminal 17c is electrically connected to the KCD circuit 12e of the lane reproduction circuit 12-0. The output terminal 17d can be electrically connected to a control terminal 18c of the selector 18-0. Thus, the presence/absence of an error occurring can be detected in the reference lane LN-0.

The selector 18-0 has input terminals 18a, 18b, a control terminal 18c, and an output terminal 18d. The input terminal 18a is electrically connected to the output terminal 219b of the fixed delay circuit 219. The input terminal 18b is electrically connected to the output terminal of the timing adjustment circuit 13-0. The control terminal 18c can be electrically connected to the output terminal 17d of the error detection circuit 17-0. The output terminal 18d is electrically connected to the lane reproduction output 15-0 and the input terminal 18a of the selector 18-1.

The fixed delay circuit 219 has an input terminal 219a and an output terminal 219b. The input terminal 219a is electrically connected to the output terminal 18d of the selector 18-3. Thus, the output terminal 219b is electrically connected to the input terminal 18a of the selector 18-0. The fixed delay circuit 219 gives a fixed delay D (e.g., a delay equal to one clock cycle of the pixel clock φCK) to pixel data outputted from the selector 18-3 to input to the selector 18-0.

When receiving the error detection flag φER0 via the control terminal 18c, the selector 18-0 electrically connects one of the output terminal of the timing adjustment circuit 13-0 and the output terminal 219b of the fixed delay circuit 219 to the lane reproduction output 15-1 according to the error detection flag φER0.

The selector 18-0 electrically connects the output terminal of the timing adjustment circuit 13-0 to the lane reproduction output 15-0 if the error detection flag φER0 is deasserted. That is, if the error detection circuit 17-0 has not detected a data error in the lane reproduction circuit 12-0, the selector 18-0 electrically connects the output terminal of the timing adjustment circuit 13-0 to the lane reproduction output 15-0. Thus, if pixel data of the lane LN-0 having been transferred via the lane reproduction circuit 12-0 and via the timing adjustment circuit 13-0 does not include an error, the pixel data can be transferred to the lane reproduction output 15-0. The lane reproduction output 15-0 transfers the pixel data to the image processing circuit 4 (see FIG. 1).

The selector 18-0 electrically connects the output terminal 219b of the fixed delay circuit 219 to the lane reproduction output 15-0 if the error detection flag φER0 is asserted. That is, if the error detection circuit 17-0 has detected a data error in the lane reproduction circuit 12-0, the selector 18-0 electrically connects the output terminal 219b of the fixed delay circuit 219 to the lane reproduction output 15-0. Thus, the fixed delay circuit 219 can delay pixel data outputted from the selector 18-3 by the fixed delay D to transfer to the lane reproduction output 15-0 via the selector 18-0. That is, transferring pixel data including an error to the lane reproduction output 15-0 can be prevented, and pixel data of the lane LN-0 can be replaced with pixel data of the lane LN-3 adjacent thereto on the frame image IM (see FIG. 3), which is transferred to the lane reproduction output 15-0. That is, the lane LN-0 and the lane LN-3 can be regarded as adjacent lanes LN in view of continuity of image transfer. The lane reproduction output 15-0 transfers the pixel data after the replacement to the image processing circuit 4 (see FIG. 1).

Further, because in the second embodiment error detection and pixel replacement are possible in all the lanes LN-0 to LN-3 in the reception processing circuit 210, the reception processing circuit may be configured to identify a lane having a low error incidence beforehand and to switch the reference lane to the identified lane. That is, the de-skew circuit 216 may have the function of selecting a lane as a timing reference of de-skewing.

Specifically, in the reception processing circuit 210, the de-skew circuit 216 has a reference selection circuit 214 instead of the reference selection circuit 14. The reference selection circuit 214 has selectors 214a, 214b. The selectors 214a, 214b each receive a reference selecting signal φRLS via their control terminal and performs selecting operation to select a lane as the reference lane according to the reference selecting signal φRLS. Further, the timing adjustment circuit 13-0 has a phase difference detection circuit 13d and a delay adjustment circuit 13c instead of the fixed delay circuit 13b (see FIG. 2) as do the other timing adjustment circuits 13-1 to 13-3.

For example, if the reference selecting signal φRLS designates the selection of the lane LN-0, then the selector 214a receives the clock φCK0 from the UnPack circuit 12g of the lane reproduction circuit 12-0 of the lane LN-0 to distribute as a pixel clock φCK of reading operation to the timing adjustment circuits 13-0 to 13-3. The selector 214b supplies output data of the FIFO memory 13a of the reference lane LN-0 to an input terminal of the phase difference detection circuit 13d of each lane LN-0 to LN-3. Thus, the de-skew circuit 216 performs operation with the lane LN-0 as the reference lane.

For example, if the reference selecting signal φRLS designates the selection of the lane LN-1, then the selector 214a receives the clock φCK1 from the UnPack circuit 12g of the lane reproduction circuit 12-1 of the lane LN-1 to distribute as the pixel clock φCK of reading operation to the timing adjustment circuits 13-0 to 13-3. The selector 214b supplies output data of the FIFO memory 13a of the reference lane LN-1 to an input terminal of the phase difference detection circuit 13d of each lane LN-0 to LN-3. Thus, the de-skew circuit 216 performs operation with the lane LN-1 as the reference lane.

For example, if the reference selecting signal φRLS designates the selection of the lane LN-2, then the selector 214a receives the clock φCK2 from the UnPack circuit 12g of the lane reproduction circuit 12-2 of the lane LN-2 to distribute as the pixel clock φCK of reading operation to the timing adjustment circuits 13-0 to 13-3. The selector 214b supplies output data of the FIFO memory 13a of the reference lane LN-2 to an input terminal of the phase difference detection circuit 13d of each lane LN-0 to LN-3. Thus, the de-skew circuit 216 performs operation with the lane LN-2 as the reference lane.

For example, if the reference selecting signal φRLS designates the selection of the lane LN-3, then the selector 214a receives the clock φCK3 from the UnPack circuit 12g of the lane reproduction circuit 12-3 of the lane LN-3 to distribute as the pixel clock φCK of reading operation to the timing adjustment circuits 13-0 to 13-3. The selector 214b supplies output data of the FIFO memory 13a of the reference lane LN-3 to an input terminal of the phase difference detection circuit 13d of each lane LN-0 to LN-3. Thus, the de-skew circuit 216 performs operation with the lane LN-3 as the reference lane.

Further, because in the second embodiment error detection and pixel replacement are possible in all the lanes LN-0 to LN-3 in the reception processing circuit 210, the reception processing circuit may be configured to be able to switch the replacing function on/off for each lane LN. That is, the reception processing circuit 210 may have a function that enables selecting the on/off of the replacing function.

Specifically, the reception processing circuit 210 further has multiple selectors 221-0 to 221-3.

The selector 221-0 has input terminals 221a, 221b, 221c, a control terminal 221d, and an output terminal 221e. The input terminal 221a is electrically connected to the output terminal 17d of the error detection circuit 17-0. The input terminal 221b is connected to a fixed level of zero (de-assert level). The input terminal 221c is connected to a fixed level of one (assert level). A replacement control signal φIP0 is supplied to the control terminal 221d. The output terminal 221e is electrically connected to the control terminal 18c of the selector 18-0.

For example, if the replacement control signal φIP0 designates "through", then the selector 221-0 allows the error detection flag φER0 received from the error detection circuit 17-0 to pass through the selector 221-0 to be outputted to the control terminal 18c of the selector 18-0. Thus, the selector 18-0 performs selecting operation according to the error detection flag φER0 so as to switch on the replacing function according to the error detection flag φER0.

For example, if the replacement control signal φIP0 designates "fixed at zero", then the selector 221-0 outputs the fixed level of zero (de-assert level) to the control terminal 18c of the selector 18-0. Thus, the selector 18-0 fixedly electrically connects the output terminal of the timing adjustment circuit 13-0 to the lane reproduction output 15-0, so that it can switch off the replacing function.

For example, if the replacement control signal φIP0 designates "fixed at one", then the selector 221-0 outputs the fixed level of one (assert level) to the control terminal 18c of the selector 18-0. Thus, the selector 18-0 fixedly electrically connects the output terminal 219b of the fixed delay circuit 219 to the lane reproduction output 15-1, so that it can fixedly switch on the replacing function.

The other selectors 221-1 to 221-3 are the same as the selector 221-0. Note that the replacement control signal φIP0, φIP1, φIP2, φIP3 supplied to the control terminals 221d of the selectors 221-0, 221-1, 221-2, 221-3 are determined individually, so that the on/off of the replacing function is selectable individually for each lane LN-0 to LN-3.

By configuring the reception processing circuit 210 to have the function of selecting a lane as a timing reference of de-skewing or the function that enables selecting the on/off of the replacing function for each lane LN, the reception processing circuit can also deal with a use case where a particular lane is not used.

For example, where three lanes LN-0, LN-1, LN-3 are used without using the lane LN-2, if an error occurs in the lane LN-3, error pixels in the lane LN-3 can be replaced with data of the lane LN-1 by selecting "fixed at one" in the selectors 221-2 of the lane LN-2.

Further, for example, by selecting "fixed at one" in the selectors 221-0 to 221-3 of all the lanes LN-0 to LN-3, the replacement operation in the reception processing circuit 210 can be made to be completely off, in which state pixel data in each lane can be transferred to the image processing circuit 4 (see FIG. 1). Thus, the state of transmission errors occurring can be observed on a screen (see 53 of FIG. 5).

As described above, in the second embodiment, in the reception processing circuit 210, the error detection circuit 17 of each of the lanes LN including the reference lane detects the occurrence of a transmission error, and pixel data of the lane LN where a transmission error has occurred can be replaced with pixel data of an adjacent lane LN. Thus, degradation in image quality due to the transmission error in an image obtained from one frame worth of pixel data (image data) transmitted by the reception processing circuit 210 can be further suppressed.

Third Embodiment

Figure 8:
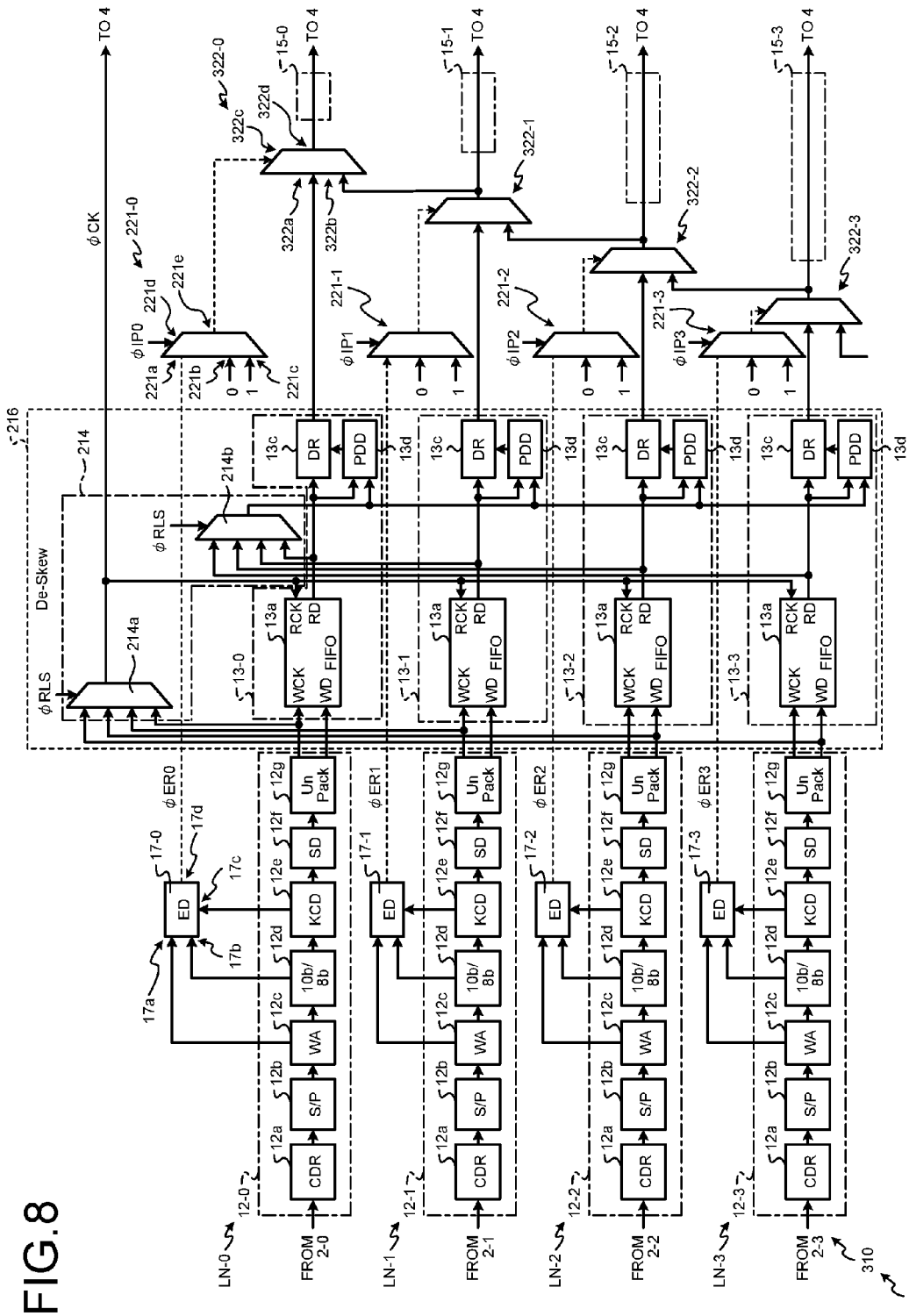
FIG. 8 is a diagram showing the configuration of an image data receiving device according to a third embodiment.

Next, an image data receiving device 301 according to the third embodiment will be described. FIG. 8 is a diagram showing the configuration of a reception processing circuit 310 in the image data receiving device 301. Description will be made below focusing on the differences from the second embodiment.

In the second embodiment, pixel data of any lane LN-0 to LN-3 is replaced with pixel data on the front side thereof (on the left thereof in FIG. 3) in response to an error having occurred therein. In the third embodiment, pixel data of any lane LN-0 to LN-2 is replaced with pixel data on the back side thereof (on the right thereof in FIG. 3), not the front side in response to an error having occurred therein.

Specifically, the reception processing circuit 310 in the image data receiving device 301 has multiple selectors 322-0 to 322-3 instead of the multiple selectors 18-0 to 18-3 (see FIG. 7).

The selector 322-0 has input terminals 322a, 322b, a control terminal 322c, and an output terminal 322d. The input terminal 322a is electrically connected to the output terminal of the timing adjustment circuit 13-0. The input terminal 322b is electrically connected to the output terminal of the timing adjustment circuit 13-1. The control terminal 322c is electrically connected to the output terminal 221e of the selector 221-0. The output terminal 322d is electrically connected to the lane reproduction output 15-0.

The selector 322-0 electrically connects the output terminal of the timing adjustment circuit 13-0 to the lane reproduction output 15-0 if the error detection flag φER0 is allowed to pass through the selector 221-0 and is de-asserted. Thus, if pixel data of the lane LN-0 having been transferred via the lane reproduction circuit 12-0 and via the timing adjustment circuit 13-0 does not include an error, the pixel data can be transferred to the lane reproduction output 15-0.

The selector 322-0 electrically connects the output terminal 322*d* of the selector 322-1 to the lane reproduction output 15-0 if the error detection flag ϕER0 is allowed to pass through the selector 221-0 and is asserted. Thus, transferring pixel data including an error to the lane reproduction output 15-0 can be prevented, and pixel data of the lane LN-0 can be replaced with pixel data of the lane LN-1 adjacent thereto and below in FIG. 8, which is transferred to the lane reproduction output 15-0.

The selectors 322-1, 322-2 are the same as the selector 322-0.

The selector 322-3 has input terminals 322*a*, 322*b*, a control terminal 322*c*, and an output terminal 322*d*. The input terminal 322*a* is electrically connected to the output terminal of the timing adjustment circuit 13-3. The input terminal 322*b* is not in use but, e.g., open. The control terminal 322*c* is electrically connected to the output terminal 221*e* of the selector 221-3. The output terminal 322*d* is electrically connected to the lane reproduction output 15-3.

In the reception processing circuit 310, in order to reduce its circuit scale, the replacing function of the lane LN-3 is fixed to be off. For example, the replacement control signal ϕIP3 designates "fixed at one", and the selector 221-3 outputs the fixed level of zero (de-assert level) to the control terminal 322*c* of the selector 322-3. Thus, the selector 322-3 fixedly electrically connects the output terminal of the timing adjustment circuit 13-3 to the lane reproduction output 15-3.

Further, in the reception processing circuit 310, since the replacing function of the lane LN-3 is fixed to be off, the lane LN-3 can be selected as the reference lane. For example, the reference selecting signal ϕRLS designates the selection of the lane LN-3, so that the selector 214*a* receives the clock ϕCK3 from the UnPack circuit 12*g* of the lane reproduction circuit 12-3 of the lane LN-3 to distribute as the pixel clock ϕCK of reading operation to the timing adjustment circuits 13-0 to 13-3. The selector 214*b* supplies output data of the FIFO memory 13*a* of the reference lane LN-3 to an input terminal of the phase difference detection circuit 13*d* of each lane LN-0 to LN-3.

As described above, in the third embodiment, in the reception processing circuit 310, the error detection circuit 17 of each lane LN detects the occurrence of a transmission error, and pixel data of the lane LN where a transmission error has occurred, other than the reference lane, is replaced with pixel data of the lane LN adjacent thereto and below in FIG. 8. That is, pixel data of any lane LN-0 to LN-2 is replaced with pixel data adjacent thereto and on the back side in the frame image IM (on the right thereof in FIG. 3) in response to an error having occurred therein. Thus, degradation in image quality due to the transmission error in an image obtained from one frame worth of pixel data (image data) transmitted by the reception processing circuit 310 can be suppressed.

Figure 9:
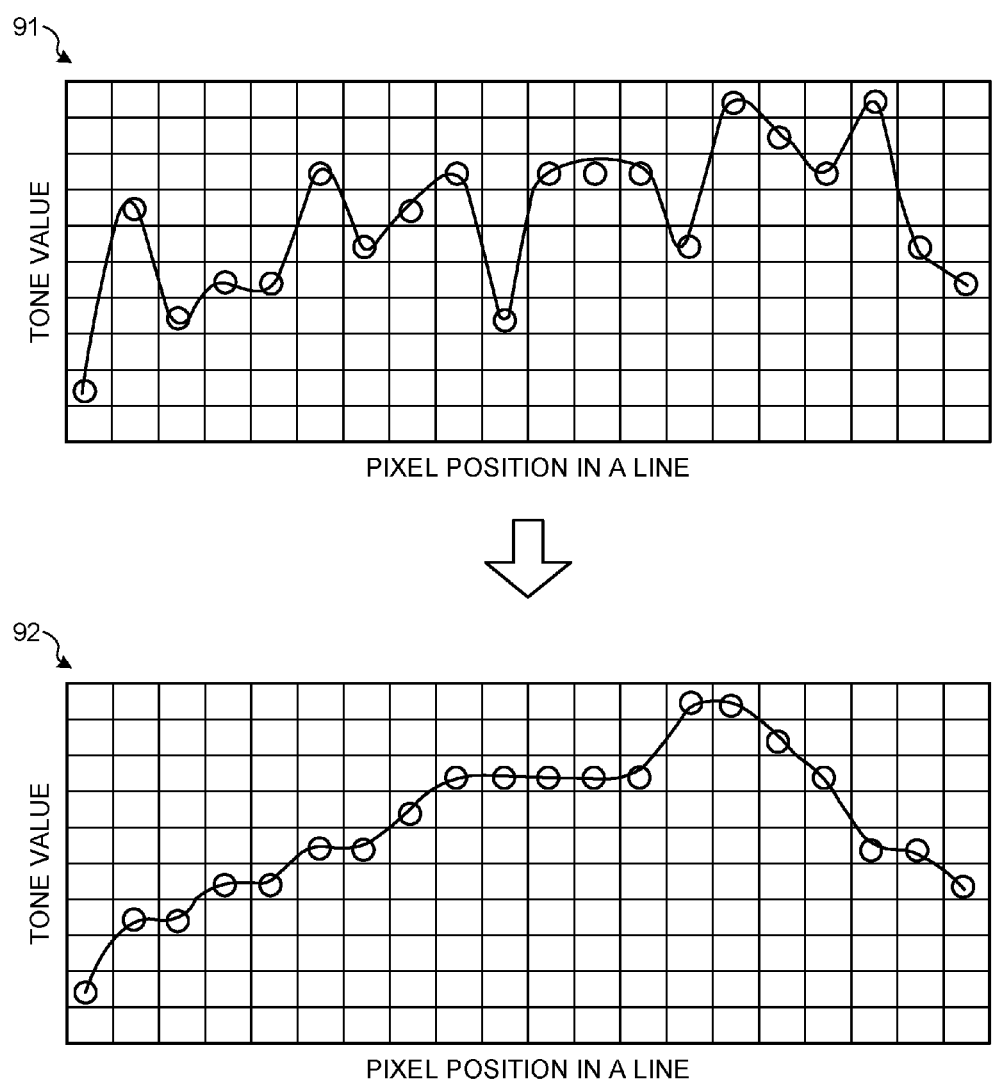
FIG. 9 is graphs showing replacement processing of pixel data in the third embodiment.

For example, as shown in 91 of FIG. 9, if a transmission error occurs in the lane reproduction circuits 12-1 of the lane LN-1, then tone values of the predetermined color component in pixel data of the lane LN-1 become inappropriate values that are greatly different from tone values of an adjacent lane LN. At this time, because pixel data of the lane LN-1 can be replaced with pixel data of the adjacent lane LN-2, tone values of pixel data of the lane LN-1 can be made close to more appropriate values as shown in 92 of FIG. 9. Thus, as shown in 92 of FIG. 9, the distribution of tone values of pixel data recovered in the reception processing circuit 310 can be made close to the distribution of tone values of pixel data at the time of transmission (see 51 of FIG. 5). Therefore, screen noise can be made visually not conspicuous in an image obtained by the image processing circuit 4 (see FIG. 1) from one frame worth of pixel data (data of the frame image IM), so that the image quality can be improved.

Note that by combining the configuration of the reception processing circuit 10 of the first embodiment and the configuration of the reception processing circuit 310 of the third embodiment, the average values of pixel data before and after subject data in the frame image IM can also be used as replace pixel data.

Fourth Embodiment

Figure 10:
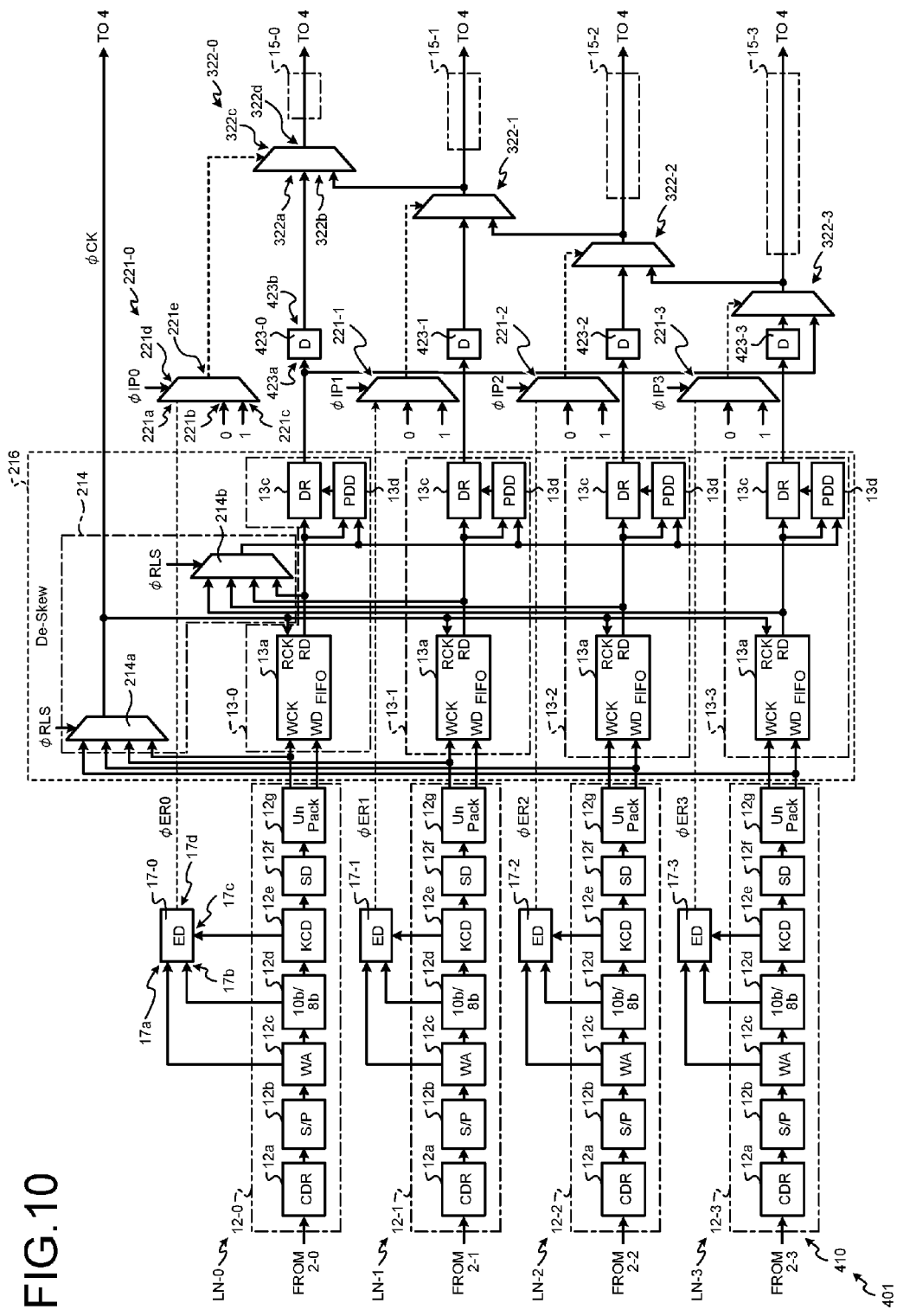
FIG. 10 is a diagram showing the configuration of an image data receiving device according to a fourth embodiment.

Next, an image data receiving device 401 according to the fourth embodiment will be described. FIG. 10 is a diagram showing the configuration of a reception processing circuit 410 in the image data receiving device 401. Description will be made below focusing on the differences from the third embodiment.

In the third embodiment, pixel data of any lane LN-0 to LN-2 other than the reference lane LN-3 is replaced with pixel data on the back side thereof (on the right thereof in FIG. 3) in response to an error having occurred therein. In the fourth embodiment, the reception processing circuit is configured such that also the replacement of pixel data of the reference lane LN-3 with pixel data on the back side thereof (on the right thereof in FIG. 3) can be performed in response to an error having occurred therein.

Specifically, the reception processing circuit 410 in the image data receiving device 401 further has multiple fixed delay circuits 423-0 to 423-3.

The fixed delay circuit 423-0 has an input terminal 423 *a* and an output terminal 423 *b*. The input terminal 423 *a* is electrically connected to the output terminal of the timing adjustment circuit 13-0. The output terminal 423 *b* is electrically connected to the input terminal 322*a* of the selector 322-0. Thus, the fixed delay circuit 423-0 gives a fixed delay D (e.g., a delay equal to one clock cycle of the pixel clock ϕCK) to pixel data outputted from the timing adjustment circuit 13-0 to input to the selector 322-0.

The other fixed delay circuits 423-1 to 423-3 are the same as the fixed delay circuit 423-0.

Further, the fourth embodiment differs from the third embodiment in that the input terminal 322*b* of the selector 322-3 is not unused but is connected to the output terminal of the timing adjustment circuit 13-0.

For example, the selector 322-3 electrically connects the output terminal of the timing adjustment circuit 13-3 to the lane reproduction output 15-3 if the error detection flag ϕER3 is allowed to pass through the selector 221-3 and is de-asserted. Thus, if pixel data of the lane LN-3 having been transferred via the lane reproduction circuit 12-3 and via the timing adjustment circuit 13-3 does not include an error, the pixel data can be delayed by the fixed delay D by the fixed delay circuit 423-3 and transferred to the lane reproduction output 15-3.

The selector 322-3 electrically connects the output terminal of the timing adjustment circuit 13-0 to the lane reproduction output 15-3 if the error detection flag ϕER3 is allowed to pass through the selector 221-3 and is asserted. Thus, transferring pixel data including an error to the lane reproduction output 15-3 can be prevented, and pixel data of the lane LN-3 can be replaced with pixel data of the lane LN-0 (see FIG. 3) adjacent thereto on the frame image IM, which is transferred to the lane reproduction output 15-3. The lane reproduction output 15-3 transfers the pixel data after the replacement to the image processing circuit 4 (see FIG. 1).

As described above, in the fourth embodiment, in the reception processing circuit 410, the error detection circuit 17 of each of the lanes LN including the reference lane detects the occurrence of a transmission error, and pixel data of the lane LN where a transmission error has occurred can be replaced with pixel data of an adjacent lane LN. Thus, degradation in image quality due to the transmission error in an image obtained from one frame worth of pixel data (image data) transmitted by the reception processing circuit 410 can be further suppressed.

Note that by combining the configuration of the reception processing circuit 210 of the second embodiment and the configuration of the reception processing circuit 410 of the fourth embodiment, the average values of pixel data before and after subject data in the frame image IM can also be used as replace pixel data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image data receiving device comprising:
   $1^{st}$ to $K^{th}$ lane reproduction circuits, where K is an integer of two or greater;
   $1^{st}$ to $K^{th}$ timing adjustment circuits;
   $1^{st}$ to $K^{th}$ lane reproduction outputs; and
   $1^{st}$ to $(K-1)^{th}$ selectors,
   if letting N be a positive integer smaller than K and n be a positive integer, the $N^{th}$ lane reproduction circuit transmitting data of a $n^{th}$ pixel,
   the $(N+1)^{th}$ lane reproduction circuit transmitting data of an $(n+1)^{th}$ pixel adjacent to the $n^{th}$ pixel,
   the $N^{th}$ timing adjustment circuit having an input terminal electrically connected to the $N^{th}$ lane reproduction circuit,
   the $(N+1)^{th}$ timing adjustment circuit having an input terminal electrically connected to the $(N+1)^{th}$ lane reproduction circuit,
   the $N^{th}$ lane reproduction output being able to be electrically connected to an output terminal of the $N^{th}$ timing adjustment circuit, and
   the $N^{th}$ selector being able to electrically connect one of the output terminal of the $N^{th}$ timing adjustment circuit and the output terminal of the $(N+1)^{th}$ timing adjustment circuit to the $(N+1)^{th}$ lane reproduction output.

2. The image data receiving device according to claim 1, wherein
   the $N^{th}$ selector electrically connects one of an output terminal of the $(N-1)^{th}$ selector and the output terminal of the $(N+1)^{th}$ timing adjustment circuit to the $(N+1)^{th}$ lane reproduction output.

3. The image data receiving device according to claim 1, wherein
   letting m be a positive integer smaller than or equal to n, the $1^{st}$ lane reproduction circuit transmits data of a $m^{th}$ pixel,
   wherein the second lane reproduction circuit transmits data of an $(m+1)^{th}$ pixel,
   wherein the $K^{th}$ lane reproduction circuit transmits data of an $(m-1)^{th}$ pixel,
   wherein the $K^{th}$ timing adjustment circuit has an input terminal electrically connected to the $K^{th}$ lane reproduction circuit,
   wherein the $(K-1)^{th}$ selector electrically connects one of an output terminal of the $(K-2)^{th}$ selector and the output terminal of the $K^{th}$ timing adjustment circuit to the $K^{th}$ lane reproduction output, and
   wherein the image data receiving device further comprises:
   a delay circuit that has an input terminal electrically connected to the output terminal of the $(K-1)^{th}$ selector, and
   a $K^{th}$ selector that electrically connects one of an output terminal of the delay circuit and the output terminal of the $1^{st}$ timing adjustment circuit to the $1^{st}$ lane reproduction output.

4. The image data receiving device according to claim 3, wherein
   the $1^{st}$ lane reproduction circuit transmits data of the $m^{th}$ pixel during a first period,
   wherein the $2^{nd}$ lane reproduction circuit transmits data of the $(m+1)^{th}$ pixel during the first period, and
   wherein the $K^{th}$ lane reproduction circuit transmits data of the $(m-1)^{th}$ pixel during a second period preceding the first period.

5. The image data receiving device according to claim 1, further comprising $1^{st}$ to $(K-1)^{th}$ error detection circuits,
   wherein the $N^{th}$ error detection circuit has an input terminal electrically connected to the $(N+1)^{th}$ lane reproduction circuit and an output terminal that can be electrically connected to a control terminal of the $N^{th}$ selector.

6. The image data receiving device according to claim 3, further comprising $1^{st}$ to $K^{th}$ error detection circuits,
   wherein the $N^{th}$ error detection circuit has an input terminal electrically connected to the $(N+1)^{th}$ lane reproduction circuit and an output terminal that can be electrically connected to a control terminal of the $N^{th}$ selector, and
   wherein the $K^{th}$ error detection circuit has an input terminal electrically connected to the $1^{st}$ lane reproduction circuit and an output terminal that can be electrically connected to a control terminal of the $K^{th}$ selector.

7. The image data receiving device according to claim 5, wherein
   if the $1^{st}$ error detection circuit has detected a data error in the $2^{nd}$ lane reproduction circuit, the $1^{st}$ selector electrically connects the output terminal of the $1^{st}$ timing adjustment circuit to the $2^{nd}$ lane reproduction output and, if the $1^{st}$ error detection circuit has not detected a data error in the $2^{nd}$ lane reproduction circuit, electrically connects the output terminal of the $2^{nd}$ timing adjustment circuit to the $2^{nd}$ lane reproduction output, and
   wherein letting N be an integer of two or greater that is smaller than K, if the $N^{th}$ error detection circuit has detected a data error in the $(N+1)^{th}$ lane reproduction circuit, the $N^{th}$ selector electrically connects the output terminal of the $(N-1)^{th}$ selector to the $(N+1)^{th}$ lane reproduction output and, if the $N^{th}$ error detection circuit has not detected a data error in the $(N+1)^{th}$ lane reproduction circuit, electrically connects the output terminal of the $(N+1)^{th}$ timing adjustment circuit to the $(N+1)^{th}$ lane reproduction output.

8. The image data receiving device according to claim 6, wherein
if the $1^{st}$ error detection circuit has detected a data error in the second lane reproduction circuit, the $1^{st}$ selector electrically connects the output terminal of the $1^{st}$ timing adjustment circuit to the second lane reproduction output and, if the $1^{st}$ error detection circuit has not detected a data error in the second lane reproduction circuit, electrically connects the output terminal of the second timing adjustment circuit to the $2^{nd}$ lane reproduction output,
wherein letting N be an integer of two or greater that is smaller than K, if the $N^{th}$ error detection circuit has detected a data error in the $(N+1)^{th}$ lane reproduction circuit, the $N^{th}$ selector electrically connects the output terminal of the $(N-1)^{th}$ selector to the $(N+1)^{th}$ lane reproduction output and, if the $N^{th}$ error detection circuit has not detected a data error in the $(N+1)^{th}$ lane reproduction circuit, electrically connects the output terminal of the $(N+1)^{th}$ timing adjustment circuit to the $(N+1)^{th}$ lane reproduction output, and
wherein if the $K^{th}$ error detection circuit has detected a data error in the $1^{st}$ lane reproduction circuit, the $K^{th}$ selector electrically connects the output terminal of the delay circuit to the $1^{st}$ lane reproduction output and, if the $K^{th}$ error detection circuit has not detected a data error in the $1^{st}$ lane reproduction circuit, electrically connects the output terminal of the $1^{st}$ timing adjustment circuit to the $1^{st}$ lane reproduction output.

9. The image data receiving device according to claim 1, further comprising a reference selection circuit that supplies a reference clock as a clock of reading operation to the $1^{st}$ to $K^{th}$ timing adjustment circuits,
wherein the $N^{th}$ timing adjustment circuit has a FIFO memory into which pixel data is written synchronously with a clock received from the $N^{th}$ lane reproduction circuit and which outputs the pixel data synchronously with the clock of reading operation received from the reference selection circuit.

10. The image data receiving device according to claim 9, wherein
the reference selection circuit selects a lane reproduction circuit of a reference from among the $1^{st}$ to $K^{th}$ lane reproduction circuits and supplies a clock received from the lane reproduction circuit of the reference as the clock of reading operation, to the $1^{st}$ to $K^{th}$ timing adjustment circuits.

11. The image data receiving device according to claim 6, further comprising $1^{st}$ to $K^{th}$ replacement control circuits,
wherein the $N^{th}$ replacement control circuit has a control terminal to which a replacement control signal is supplied, an input terminal electrically connected to the $N^{th}$ error detection circuit, an input terminal fixed at a de-assert level, an input terminal fixed at an assert level, and an output terminal electrically connected to the control terminal of the $N^{th}$ selector.

12. The image data receiving device according to claim 11, wherein
the $N^{th}$ replacement control circuit switches between an operation of allowing an error detection flag received from the $N^{th}$ error detection circuit to pass through to be output to the control terminal of the $N^{th}$ selector, an operation of outputting the de-assert level to the control terminal of the selector, and an operation of outputting the assert level to the control terminal of the selector.

13. An image data receiving device comprising:
$1^{st}$ to $K^{th}$ lane reproduction circuits, where K is an integer of two or greater;
$1^{st}$ to $K^{th}$ timing adjustment circuits;
$1^{st}$ to $K^{th}$ lane reproduction outputs; and
$1^{st}$ to $K^{th}$ selectors,
if letting N be a positive integer smaller than K and n be a positive integer, the $N^{th}$ lane reproduction circuit transmitting data of a $n^{th}$ pixel,
the $(N+1)^{th}$ lane reproduction circuit transmitting data of an $(n+1)^{th}$ pixel adjacent to the nth pixel,
the $N^{th}$ timing adjustment circuit having an input terminal electrically connected to the $N^{th}$ lane reproduction circuit,
the $(N+1)^{th}$ timing adjustment circuit having an input terminal electrically connected to the $(N+1)^{th}$ lane reproduction circuit,
the $N^{th}$ lane reproduction output being able to be electrically connected to an output terminal of the $N^{th}$ timing adjustment circuit, and
the $N^{th}$ selector being able to electrically connect one of the output terminal of the $N^{th}$ timing adjustment circuit and the output terminal of the $(N+1)^{th}$ timing adjustment circuit to the $N^{th}$ lane reproduction output.

14. The image data receiving device according to claim 13, wherein
the $N^{th}$ selector electrically connects one of the output terminal of the $N^{th}$ timing adjustment circuit and an output terminal of the $(N+1)^{th}$ selector to the $N^{th}$ lane reproduction output.

15. The image data receiving device according to claim 13, further comprising $1^{st}$ to $K^{th}$ delay circuits,
wherein the $N^{th}$ delay circuit is connected between the output terminal of the $N^{th}$ timing adjustment circuit and an input terminal of the $N^{th}$ selector, and
wherein the $K^{th}$ selector electrically connects one of the output terminal of the $1^{st}$ timing adjustment circuit and an output terminal of the $K^{th}$ delay circuit to the $K^{th}$ lane reproduction output.

16. The image data receiving device according to claim 15, wherein
the $1^{st}$ lane reproduction circuit transmits data of the $m^{th}$ pixel during a first period,
wherein the second lane reproduction circuit transmits data of the $(m+1)^{th}$ pixel during the first period, and
wherein the $K^{th}$ lane reproduction circuit transmits data of the $(m-1)^{th}$ pixel during a second period preceding the first period.

17. The image data receiving device according to claim 13, further comprising $1^{st}$ to $K^{th}$ error detection circuits,
wherein the $N^{th}$ error detection circuit has an input terminal electrically connected to the $N^{th}$ lane reproduction circuit and an output terminal that can be electrically connected to a control terminal of the $N^{th}$ selector.

18. The image data receiving device according to claim 17, wherein
if the $N^{th}$ error detection circuit has detected a data error in the $N^{th}$ lane reproduction circuit, the $N^{th}$ selector electrically connects the output terminal of the $(N+1)^{th}$ selector to the $N^{th}$ lane reproduction output and, if the $N^{th}$ error detection circuit has not detected a data error in the $N^{th}$ lane reproduction circuit, electrically connects the output terminal of the $N^{th}$ timing adjustment circuit to the $N^{th}$ lane reproduction output.

19. The image data receiving device according to claim 13, further comprising a reference selection circuit that selects a lane reproduction circuit of a reference from among the $1^{st}$ to $K^{th}$ lane reproduction circuits and that supplies a clock received from the lane reproduction circuit of the reference as a clock of reading operation, to the $1^{st}$ to $K^{th}$ timing adjustment circuits, wherein the $N^{th}$ timing adjustment circuit has a FIFO memory into which pixel data is written synchronously with a clock received from the $N^{th}$ lane reproduction circuit and which outputs the pixel data synchronously with the clock of reading operation received from the reference selection circuit.

20. The image data receiving device according to claim 19, further comprising $1^{st}$ to $K^{th}$ replacement control circuits, wherein the $N^{th}$ replacement control circuit has a control terminal to which a replacement control signal is supplied, an input terminal electrically connected to the $N^{th}$ error detection circuit, an input terminal fixed at a de-assert level, an input terminal fixed at an assert level, and an output terminal electrically connected to the control terminal of the $N^{th}$ selector.

* * * * *